US006718015B1

(12) United States Patent
Berstis

(10) Patent No.: US 6,718,015 B1
(45) Date of Patent: Apr. 6, 2004

(54) REMOTE WEB PAGE READER

(75) Inventor: Viktors Berstis, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/213,318

(22) Filed: Dec. 16, 1998

(51) Int. Cl.[7] .......................... H04M 1/64; G10L 11/00; G06F 15/00

(52) U.S. Cl. ................................ 379/88.17; 379/88.13; 704/270.1; 715/513

(58) Field of Search ........................... 379/88.01, 88.04, 379/88.11, 88.13, 88.14, 88.16, 88.17, 88.22–88.25, 93.01, 93.26, 100.01, 100.13; 704/270, 275; 370/352–356; 715/501; 455/412, 413, 420, 563; 709/310, 311, 201, 203

(56) References Cited

U.S. PATENT DOCUMENTS

| | | | | | |
|---|---|---|---|---|---|
| 5,418,844 | A | * | 5/1995 | Morrisey et al. | 379/114.05 |
| 5,436,957 | A | * | 7/1995 | McConnell | 379/196 |
| 5,497,373 | A | * | 3/1996 | Hulen et al. | 370/259 |
| 5,689,642 | A | * | 11/1997 | Harkins et al. | 709/207 |
| 5,761,280 | A | * | 6/1998 | Noonen et al. | 379/93.27 |
| 5,799,063 | A | * | 8/1998 | Krane | 379/88.17 |
| 5,819,220 | A | * | 10/1998 | Sarukkai et al. | 704/270.1 |
| 5,825,854 | A | * | 10/1998 | Larson et al. | 379/88.14 |
| 5,838,768 | A | * | 11/1998 | Sumar et al. | 379/221.09 |
| 5,884,262 | A | * | 3/1999 | Wise et al. | 704/270.1 |
| 5,915,001 | A | * | 6/1999 | Uppaluru | 379/88.22 |
| 5,937,041 | A | * | 8/1999 | Cardillo, IV et al. | 379/93.25 |
| 5,953,392 | A | * | 9/1999 | Rhie et al. | 379/88.13 |
| 6,031,836 | A | * | 2/2000 | Haserodt | 370/389 |
| 6,055,240 | A | * | 4/2000 | Tunnicliffe | 370/230 |
| 6,101,473 | A | * | 8/2000 | Scott et al. | 704/275 |
| 6,292,480 | B1 | * | 9/2001 | May | 370/352 |
| 6,349,132 | B1 | * | 2/2002 | Wesemann et al. | 379/88.01 |
| 6,353,661 | B1 | * | 3/2002 | Bailey, III | 379/93.25 |
| 6,400,806 | B1 | * | 6/2002 | Uppaluru | 379/88.02 |
| 2002/0118800 | A1 | * | 8/2002 | Martinez et al. | 379/67.1 |

OTHER PUBLICATIONS

Harry Newton, Newton's Telecom Dictionary, Mar. 1998, Flatiron Publishing, $14^{th}$ ed., p. 354.*

Spyglass and Lucent Technologies Team up to Demonstrate Voice–controlled Web Browsing. Press Release [online]. Lucent Technologies, Oct. 12, 1998 [retrieved on May 16, 2003]. Retrieved from the Internet:<URL: www.lucent.com/press/1098/981012.coa.html>.*

* cited by examiner

*Primary Examiner*—Fan Tsang
*Assistant Examiner*—Roland G. Foster
(74) *Attorney, Agent, or Firm*—Duke W. Yee; Jeffrey S. LaBaw; Stephen R. Tkacs

(57) ABSTRACT

A method for enabling a user having access to a telephone device to browse the Internet without a Web browser. The method begins by establishing a connection between the user's telephone device and a computer. The computer includes a Web browser and a text-to-speech processor. Using the telephone device, the user enters information identifying a given URL. The input information is then supplied to the Web browser, which fetches the desired page. The text portions of the Web page are then converted to speech and output to the user over the telephone device. Alternatively, the user may elect to transmit the page to a given fax destination, to e-mail the page to a given e-mail destination address, or to e-mail the URL itself. Using the telephone as an input device, the user may selectively navigate the Web page or explore links in the page.

21 Claims, 6 Drawing Sheets

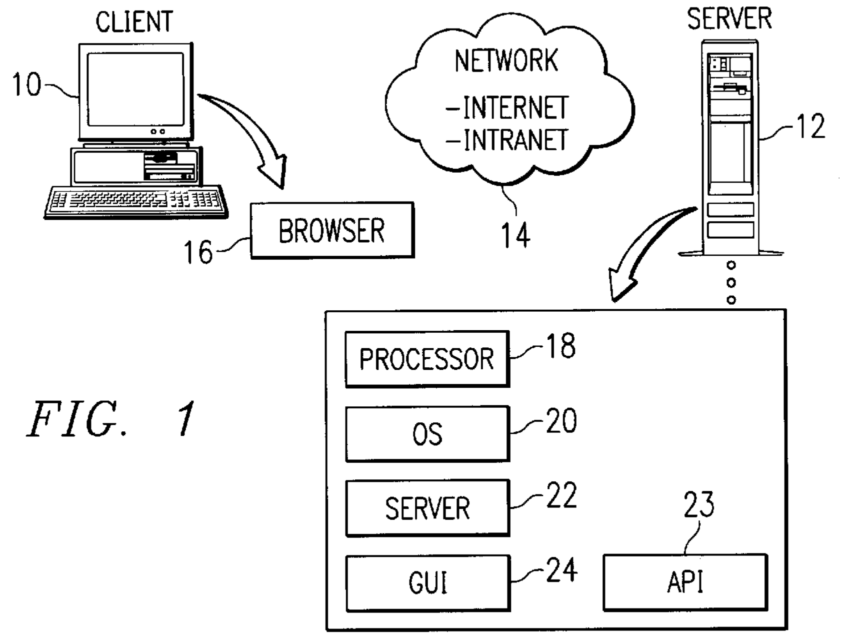
FIG. 1
FIG. 2
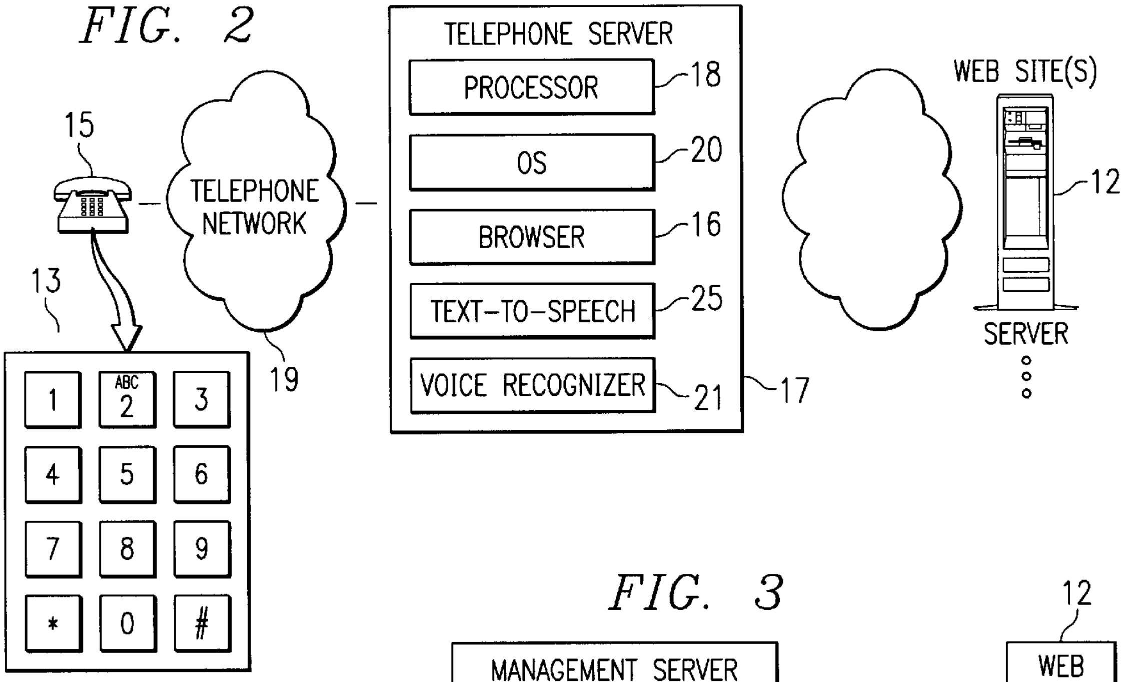
FIG. 3
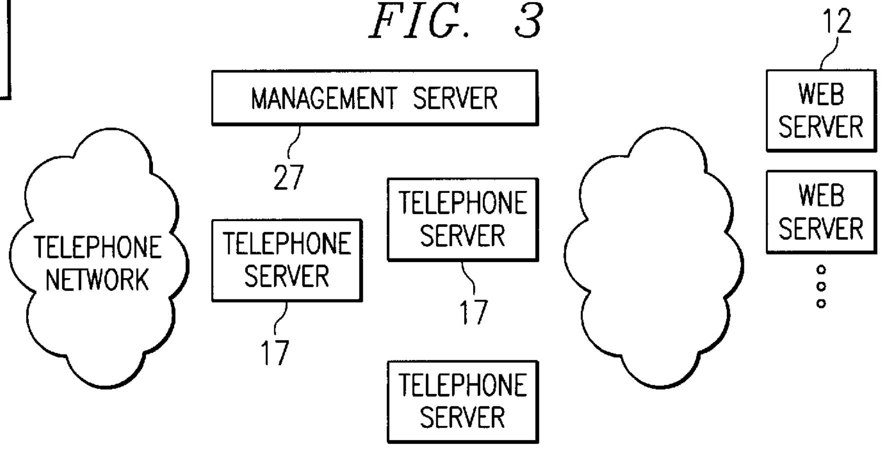

```
<TITLE>IBM News</TITLE>

<IMG ALT=" Search ">
<FORM METHOD=GET ACTION="http://www.ibm.com/cgi-bin/findit/nph-V8.2". . .
<input NAME="q" ID="textfield" type="text" size=". . .

<A HREF="/"><IMG ALT=" [ Home ] "></A>
<A HREF="/News/"><IMG ALT=" [ News ] "></A>
<A HREF="/News/"><IMG ALT=" [ News ] "></A>
<A HREF="/Products/"><IMG ALT=" [ Products & services ] "></A>
<A HREF="/Support/"><IMG ALT=" [ Support ] "></A>
<A HREF="/Solutions/"><IMG ALT=" [ Solutions ] "></A>
<A HREF="/Partners/"><IMG ALT=" [ Partners ] "></A>
<A HREF="/IBM/"><IMG ALT=" [ About IBM ] "></A>
<A HREF="/Search/"><IMG ALT=" Search ] "></A>
<A HREF="/Shop/"><IMG ALT=" Shop "></A>
<A HREF="/Contact/"><IMG ALT=" Contact IBM "></A>
<A HREF="/Download/"><IMG ALT=" Download "></A>
<A HREF="/Planetwide/Popups/other/"><IMG ALT=" Select a country "></A>
<A HREF="/javascript:launch( )"><IMG ALT=" Stock quote "></A>

December 09, 1998
10:26

<A HREF="/Privacy/"> <IMG ALT=" Privacy "></A>

<A HREF="/Legal/"><IMG ALT=" Legal "></A>

AT&T to acquire IBM's Global
Network business for $5 billion

<p>

<img alt=" [Lou Gerstner photo] ">

On December 8, AT&T and IBM
announced a series of strategic agreements under which AT&T will acquire
IBM's Global Network business for $5 billion in cash, and the two companies will
enter into outsourcing contracts with each other. IBM will outsource a
significant portion of its global networking needs to AT&T. AT&T will
outsource certain applications processing and data center management operations
to IBM.

<p> The transactions could represent $2.5 billion in additional revenue to
AT&T in the first full year of operation.

<p> The IBM Global Network business AT&T will acquire servers the networking
needs of several hundred large global companies, tens of thousands of mid-sized
businesses and more than 1 million individual Internet users in 59 countries.

<p> The acquisition boosts AT&T's strategy to rapidly increase the company's
revenue, especially at its fast-growing networking services unit, AT&T
Solutions. About 5,000 IBM employees will join AT&T as part of the
acquisition.

<p> "These strategic agreements are all about growth," said AT&T Chairman
and CEO C. Michael Armstrong. "Growth in revenue, growth in technology, and -
most important - growth in what AT&T can do for customers.

<p> "For AT&T, today's announcement supports four areas we've targeted for
```

*FIG. 8*

IBM News

Link 1 to Search requires entry. Say enter or go on.

Link 2 to Home

Link 3 to News

Link 4 to Products and services

Link 5 to Support

Link 6 to Solutions

Link 7 to Partners

Link 8 to About IBM

Link 9 to Search

Link 0 to Shop

Link 1 to Contact IBM

Link 2 to Download

Link 3 to Select a country

Link 4 to Stock quote

December 09, 1998

10:26

Link 5 to Privacy

Link 6 to Legal

AT and T to acquire IBM's Global Network business for $5 billion

Lou Gerstner photo

On December 8, AT and T and IBM announced a series of strategic agreements under which AT and T will acquire IBM's Global Network business for $5 billion in cash, and the two companies will enter into outsourcing contracts with each other. IBM will outsource a significant portion of its global networking needs to AT and T. AT and T will outsource certain applications processing and data center management operations to IBM.

The transactions could represent $2.5 billion in additional revenue to AT and T in the first full year of operation.

The IBM Global Network business AT and T will acquire serves the networking needs of several hundred large global companies, tens of thousands of mid-sized businesses and more than 1 million individual Internet users in 59 countries.

The acquisition boosts AT and T's strategy to rapidly increase the company's revenue, especially at its fast-growing networking services unit, AT and T Solutions. About 5,000 IBM employees will join AT and T as part of the acquisition.

*FIG. 9*

REMOTE WEB PAGE READER

BACKGROUND OF THE INVENTION

1. Technical Field

This invention relates generally to information retrieval in a computer network. More particularly, the invention relates to a method to retrieve information in an Internet environment without use of a conventional Web browser.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL.

When the user of the browser specifies a link, the client issues a request to a naming service to map a hostname (in the URL) to a particular network IP address at which the server is located. The naming service returns an IP address that can respond to the request. Using the IP address, the browser establishes a connection to a server. If the server is available, it returns a Web page. To facilitate further navigation, a Web page typically includes one or more hypertext references known as "anchors" or "links". In HTML, each anchor is commonly delineated by a markup language "tag" set "<a href "pathname"></a>", where "pathname" is the path information identifying the location of the linked page or object.

Web browser access, however, is not always available when desired. For example, if a user desires to retrieve information from the Web but does not have access to a computer, such information cannot be readily obtained through conventional communication methods.

This invention addresses this need.

BRIEF SUMMARY OF THE INVENTION

A primary object of the present invention is to provide methods for retrieving Web content without use of a computer or a Web browser.

Another primary object of this invention is to provide a method for reading a Web page remotely from a server and without direct use of conventional Web browser technology or Internet services.

Still another object of this invention is to enable a user to read given Web content without access to a computer, a Web browser or an Internet service provider.

A more specific object of this invention is to enable a user to access and read a Web page and to obtain or send a copy of the page (or a URL) through use of alternative Web page access method.

Another more general object of this invention is to provide Web access through use of a telephone device.

Still another important object of this invention is to enable visually-impaired users to obtain access to Web content through use of a telephone-based interface.

Yet another general object of this invention is to provide a remote Web page reader service that is accessible through a conventional telephone network device.

These and other objects of this invention are provided in a method for remote Web page reading. The method enables a user having access to a telephone device to browse the Internet without a Web browser. It begins by establishing a connection between the user's telephone device and a computer. The computer includes a Web browser and a text-to-speech processor. Using the telephone device, the user enters information identifying a given URL. Typically, the information is entered using the telephone keypad. If the computer supports a voice recognition application, the information may be entered via spoken input and then recognized using the application. The input information is then supplied to the Web browser, which fetches the desired page in the usual manner. The text portions of the Web page are then converted to speech and output to the user over the telephone device. Alternatively, the user may elect to transmit the page to a given fax destination, to e-mail the page to a given e-mail destination address, or to e-mail the URL itself. Using the telephone as an input device, the user may selectively navigate the Web page or explore other links in the page.

According to another aspect of the present invention, a remote Web page delivery service uses a computer accessible through a telephone network. The computer includes a Web browser, a text-to-speech processor, a dual tone multifrequency ("DTMF") detector, and a voice detector. The DTMF detector recognizes telephone keypad codes, and the voice detector recognizes spoken commands. A control program executes on the computer (a) for receiving from a telephone device information (e.g., keypad codes and/or spoken inputs) identifying a URL, (b) for controlling the Web browser to retrieve a Web page identified by the URL; and (c) for controlling the text-to-speech processor to convert given text in the Web page to speech. The speech is then output to the user via the telephone device. As noted above, keypad codes and/or spoken commands may be used to navigate through the page. This service has particular utility in assisting visually-impaired users to access Web page content without use of a Web browser.

The present invention thus enables a user of a conventional telephone device to access and review Web page content without use of an Internet connection, a computer or even a Web browser.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

These objects, features and advantages will be more readily understood with reference to the attached figures and following description.

FIG. 1 depicts a conventional client-server information retrieval system used to access the Internet in a known manner;

FIG. 2 depicts the remote Web page retrieval system according to the teachings of the present invention;

FIG. 3 is a simplified diagram of a remote Web page access, copying and transmission service according to the present invention;

FIG. 8 represents the partial output of a first stage of the parser routine of the present invention; and FIG. 9 represents the partial output of a second stage of the parser routine.

DETAILED DESCRIPTION OF THE PREFERRED EMBODIMENT

Figure 4:
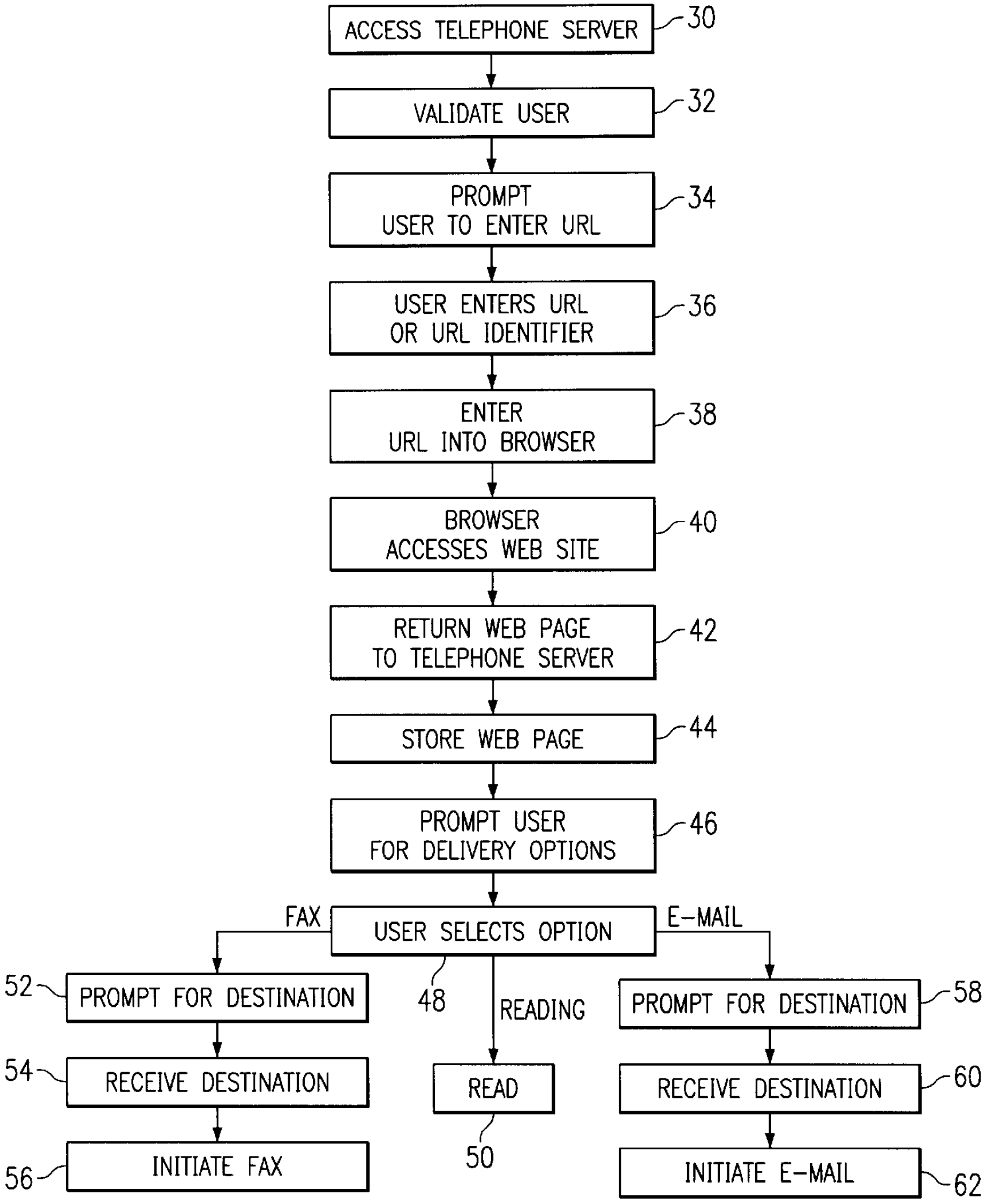
FIG. 4 depicts a flowchart illustrating a preferred implementation of the remote Web page retrieval method according to the present invention.

A known Internet client-server system is implemented is illustrated in FIG. 1. A client machine 10 is connected to a Web server 12 via network 14. For illustrative purposes, network 14 is the Internet, an intranet, an extranet or any other known network. Web server 12 is one of a plurality of servers which are accessible by clients, one of which is illustrated by machine 10. A representative client machine includes a browser 16, which is a known software tool used to access the servers of the network. The Web server supports files (collectively referred to as a "Web" site) in the form of hypertext documents and objects. In the Internet paradigm, a network path to a server is identified by a so-called Uniform Resource Locator (URL).

A representative Web server 12 is an IBM Netfinity server comprising a RISC-based processor 18, the AIX® operating system 20 and a Web server program 22, such as Netscape Enterprise Server. The server 12 also includes a graphical user interface (GUI) 24 for management and administration, and an Application Programming Interface (API) 23 that provides extensions to enable application developers to extend and/or customize the core functionality thereof through software programs including Common Gateway Interface (CGI) programs, plug-ins, servlets, active server pages, server side include (SSI) functions or the like.

A representative Web client is a personal computer that is x86-, PowerPC®- or RISC-based, that includes an operating system such as IBM® OS/2® or Microsoft Windows '95, and that includes a Web browser, such as Netscape Navigator 4.0 (or higher), having a Java Virtual Machine (JVM) and support for application plug-ins or helper applications.

Referring now to FIG. 2, the present invention enables a user to access the a Web server 12 without use of the client machine 10 or its browser 16. Rather, the Web server 12 is accessed through use of a conventional telephone network device 15. Telephone network device 15 has a conventional input device (e.g., a numerical keypad with the alphabet) and is connectable to various Web servers 12 in the network, preferably through use of a telephone server 17. Server 17 may be accessed by the telephone network device through any conventional telephone network 19. Network 19 may be a landline, a "cellular" or other wireless network, a satellite network, a personal communications network, or any other known or later-developed network for transmitting telephone-based signaling. The telephone server 17 may be accessed through any conventional means, for example, an 800-number, a 900-number, a 1+ operator service, a credit card or debit card, or any other known telephone-based access method. A user may establish an account with the telephone server 17 and prepay for the service (e.g., by paying a per page reading charge, a per access charge, or the like). The particular access technique is not a limitation of the present invention.

Typically, the telephone server 17 is a computer, and includes a processor 18, an operating system 20, and a Web browser 16. The server also preferably includes additional functions to provide the inventive service. These include a DTMF tone detector 19 for detecting telephone keypad codes, a voice detector 21 having a speech recognition application for recognizing spoken commands, and a text-to-speech processor 25 for outputting given Web page content to the caller, as will be seen. A representative speech recognition application is IBM ViaVoice®.

The telephone server 17 facilitates the provision of a remote Web. page access, copying and transmission service. As illustrated in FIG. 3, one or more such servers 17 may be managed by a management server 27. The management server provides conventional "back office" functionality such as validation, call accounting, billing and the like.

A flowchart illustrating the basic service is shown in FIG. 4. Using a conventional telephone, the user accesses the service by contacting the telephone server. A number of access methods have been previously described. This is step 30. At step 32, the user is (optionally) validated. The type of validation will depend on the nature of the security desired for the service. Thus, for example, in a subscriber-based service, the user may be prompted to enter a password that must be verified before access to the service is permitted. The password may be spoken, in which case it is then recognized using the voice recognizer 21. Alternatively, the user may enter his or her password using the numerical keypad on the telephone handset. Validation may not be required if the service is to be freely accessible.

At step 34, the user is prompted to enter a URL or a keyword (or other identifier) representing a URL to be retrieved. Thus, in a subscription-based service, the user may pre-select certain pages that he or she desires to access through the service. In this case, the user may also select certain identifiers for each such page, thus simplifying the retrieval process. At step 36, the URL or the URL identifier is entered, for example, via a spoken input or through the telephone handset keypad. In the latter case, typically each letter of the URL or the identifier is input using two keypad entries. This is because each digit on the keypad typically represents up to three (3) letters. As an example, digit "9" represents the wxy letter set. Thus, if a user desires to enter the letter "w" as part of a URL, he or she will enter "91", as the "9" represents the wxy set and the "1" represents the first letter of the set. Alternatively, one hit of the "9" digit reflects the first letter of the triad, two hits the second letter, and three hits the third.

Although not illustrated, the user may be prompted to confirm a prior entry. Thus, after step 36, the server may prompt the user "did you say/enter______?" and wait for an appropriate response before proceeding with the protocol. At step 38, the routine enters the URL into the Web browser. Thus, in step 38, information identifying the URL (if the URL is not entered directly by the user) is translated into the URL. At step 40, the Web browser accesses the identified Web site in a conventional manner. At step 42, the Web page is returned to the telephone server. Status or other information may be provided to the caller as the Web page is being retrieved. The retrieved page is then stored at step 44 for further processing.

Alternate techniques may be used to access a given page. Thus, for example, if the service is account-based, a user establishes a password-based personal account and then elects various control options. For example, the user may select one or more Web pages to retrieve, an option for determining how a Web page is output (e.g., reading, e-mailing, faxing, or the like), or an option for determining how.a given Web page is actually read (e.g., headlines only, headlines and associated stories, etc.). Thus, for example, the user may associate a given keypad code or spoken command (e.g., "New York") with a given Web page (in this example, www.nytimes.com) and then instruct the service how to read that page. Later, when the user accesses the service, the telephone server first validates the user. Using his or her preset codes or commands, the browser is then controlled to retrieve the desired page. The server then outputs the page in the manner previously specified by the user.

The above-described subscription technique may be effected on-line (e.g., by accessing a Web page and filling out an CGI-based form), or by having the user otherwise identify his or her preferences and provide such information to the service provider.

When a user contacts the service, a general menu may be accessed to enable the user to enumerate, add, delete or otherwise modify his or her preset codes or commands.

Returning back to the flowchart, the routine continues at step 46 to prompt the user to determine how the retrieved page is to be output to the user. Typically, these options include reading text portions of the page to the user, transmitting a facsimile of the page to a given telephone number, e-mailing the page to a given address, or the like. At step 48, the desired option is selected. Steps 46–48 may be omitted if a default option (e.g., reading) is used or if the user has previously indicated his or her to receive the page in a given manner. Thus, for example, the user may simply subscribe to receive fax copies of a given Web page. If the reading option is selected, the routine branches to step 50 to read the page. Further details of this process are described below in FIGS. 5–6. Following parsing, the retrieved Web page is read to the user using the text-to-speech processor 25. If the fax option is selected, the routine branches to step 52 to prompt the user for a destination telephone number. Control then continues at step 54 to receive the destination telephone number. Steps 52 and 54 may be omitted if the user has previously provided the destination telephone number (e.g., in an off-line subscription process). At step 56, the routine initiates a facsimile transmission to the desired number. The e-mail option is initiated at step 58 to prompt the user for a destination e-mail address. Control then continues at step 60 to receive the destination e-mail address. Steps 56 and 58 may be omitted if the user has previously provided the destination address. At step 62, the routine initiates the e-mail transmission of the Web page to the desired address.

As described above, the user may enter the destination fax or e-mail addresses using voice or keypad entry (or by entering identifiers that correspond to such addresses). A user may elect to receive a fax and an e-mail copy of the page. Although the above-identified page communication options are preferred, one of ordinary skill will appreciate that other options are likewise available. Thus, for example, the user may enter a given code indicating that only the URL is to be delivered (typically by e-mail) to a given address.

Figure 5:
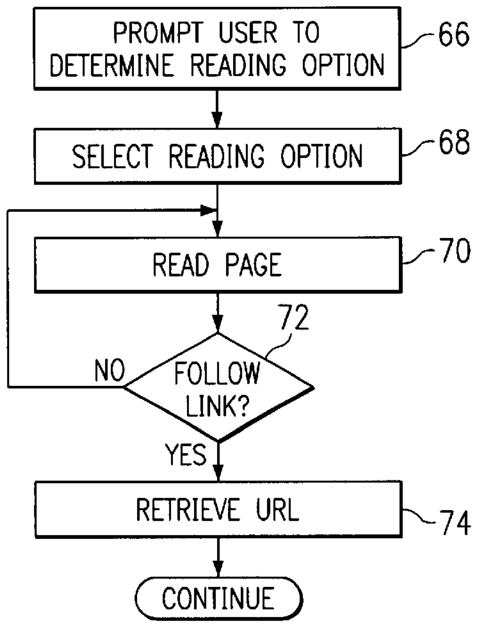
FIG. 5 depicts an flowchart of the preferred Web page reader routine of the invention.

FIG. 5 illustrates a flowchart of a preferred technique for reading the retrieved Web page. The routine begins at step 66 by prompting the user to determine which of a set of reading options is desired. One option is to read the page from a given starting point, which may be pre-selected depending on the type of page. Another option is to read just the links in the page. The particular reading option is selected at page 68 using a keypad or voice entry. At step 70, the text-to-speech application begins reading the page. Whenever a link is encountered, the routine issues a special announcement, such as "This is Link 1". As more links are encountered, the link numbers are incremented to the next digit until 9 and 0 are used. Then, preferably the next link is assigned "1" again. In this way, the last 10 links read can always be accessed and followed. Thus, a test is run at step 72 to determine whether the user desires to follow a given link. If not, the routine routines to step 70. If, however, the outcome of the test at step 72 is positive, the routine branches to step 74 to retrieve the URL identified by the link. Control then routines back to step 46 in FIG. 3 to determine how the newly-accessed page is to be output.

The present invention provides numerous advantages. Foremost, the invention enables a user to access the Web without a Web browser or even a computer or Internet service provider. Rather, the user of the service may obtain desired Web content using a conventional telephone, even a pay telephone, and without any specialized access equipment or Internet account. Using this invention, a user in a remote part of the world may obtain browser-less access to a Web page.

In particular, the invention permits one to telephone a special Web content delivery site (e.g., telephone server 17 described above). Using a touch tone keypad or a spoken input to enter a URL, the user accesses the Web page desired. The service affords various delivery options so that the user may read the page, may have the page faxed to a given fax destination, may e-mail the page to a given e-mail destination, may e-mail the URL, or the like. As the page is read, the user may be prompted to follow one or more links in the page until the desired content is obtained.

As noted above, Web page retrieval is initiated using keypad or voice commands. Further, as the user listens to the page, he or she may use the keypad controls or voice entry to navigate the page. The following table is a representative implementation of a set of keypad codes and spoken commands for effecting a given action using the Web page reader mechanism of the present invention.

| Keypad | Spoken Command | Action |
|---|---|---|
| 21 | A | A |
| 22 | B | B |
| 23 | C | C |
| 24 | COMMA | , |
| 25 | ASTERISK | * |
| 26 | COLON | : |
| 27 | SEMICOLON | ; |
| 28 | REVERSESLASH | \ |
| 29 | AMPERSAND | & |
| 31 | D | D |
| 32 | E | E |
| 33 | F | F |
| 34 | EQUAL | = |
| 36 | DOT | . |
| 37 | PERCENT | % |
| 38 | DOLLAR | $ |
| 39 | EXCLAMATION | ! |
| 41 | G | G |
| 42 | H | H |
| 43 | I | I |
| 44 | GREATERTHAN | > |
| 45 | HAT | ^ |

-continued

| Keypad | Spoken Command | Action |
|---|---|---|
| 46 | HASH | # |
| 47 | ATSIGN | @ |
| 48 | ACCENT | ` |
| 51 | J | J |
| 52 | K | K |
| 53 | L | L |
| 54 | LESSTHAN | < |
| 59 | LEFTPAREN | ( |
| 61 | M | M |
| 62 | N | N |
| 63 | O | O |
| 64 | MINUS | - |
| 71 | P | P |
| 72 | R | R |
| 73 | S | S |
| 74 | Q | Q |
| 75 | SLASH | / |
| 76 | QUOTE | " |
| 77 | PRIME | ' |
| 78 | PLUS | + |
| 79 | RIGHTPAREN | ) |
| 81 | T | T |
| 82 | U | U |
| 83 | V | V |
| 84 | TILDE | ~ |
| 85 | UNDERSCORE | _ |
| 91 | W | W |
| 92 | X | X |
| 93 | Y | Y |
| 94 | Z | Z |
| 99 | BLANK | blank |
| 00 | ZERO | 0 in alpha entry mode |
| 01 | ONE | 1 in alpha entry mode |
| 02 | TWO | 2 in alpha entry mode |
| 03 | THREE | 3 in alpha entry mode |
| 04 | FOUR | 4 in alpha entry mode |
| 05 | FIVE | 5 in alpha entry mode |
| 06 | SIX | 6 in alpha entry mode |
| 07 | SEVEN | 7 in alpha entry mode |
| 08 | EIGHT | 8 in alpha entry mode |
| 09 | NINE | 9 in alpha entry mode |
| *0 | MODE | Toggles between numeric, alpha entry modes |
| *1 | SKIP | Skips to next sentence |
| *2 | REPEAT | Repeats last 2 sentences (if commanded again backs up further) |
| *3 | NEXT PARAGRAPH | Skips to next paragraph or text break |
| *4 | NEXT HEADING | Skips to next heading tag |
| *5 | NEXT LINK | Jump to reading next link |
| *7 | PRIOR LINK | Jump to reading previous link |
| *8 | UNDO | Undo last navigation action (NEXT x -> PRIOR x) |
| *9 | MENU | Gives prompt menu of possible actions |
| **nnn | CODE nnn | ASCII code for special character in decimal |
| #0 | STOP | Accept new URL |
| #1 | URL | Accept new URL |
| #2 | READ | Reads the page |
| #3 | FAX | Faxes the page |
| #4 | E MAIL | E-mails the page |
| #5 | BACK | Backs up to prior web page visited |
| #9 | BACKSPACE | Backs up one character |
| ### | FOLLOW LINK | Follows link just read or being read |
| ##n | FOLLOW n | Follows link numbered "n" |

One of ordinary skill will appreciate that a user may control the reading of a Web page with a combination of keypad entries and spoken commands. Of course, any other convenient set of commands may be implemented. Thus, for example, if the reading service is provided in another language, a different set of control codes is used.

As noted above, preferably the user is prompted by the service to confirm a given action before the action is taken. Thus, for example, the service may prompt the user to validate the user's request to follow a given link before the page identified by the link is retrieved.

One of ordinary skill in the art will appreciate that a Web page comprises much more than the simple text stream rendered on the browser. Web content is typically formatted according to a given markup language (e.g., HTML, XML or the like), and even the simplest of pages usually includes graphics (e.g., .gif files) and other image content. Thus, the Web page reader mechanism of the present invention preferably also includes a parser for filtering given material in the page so that, when the page is read to the caller, only relevant material (e.g., actual text) is output.

Figure 6:
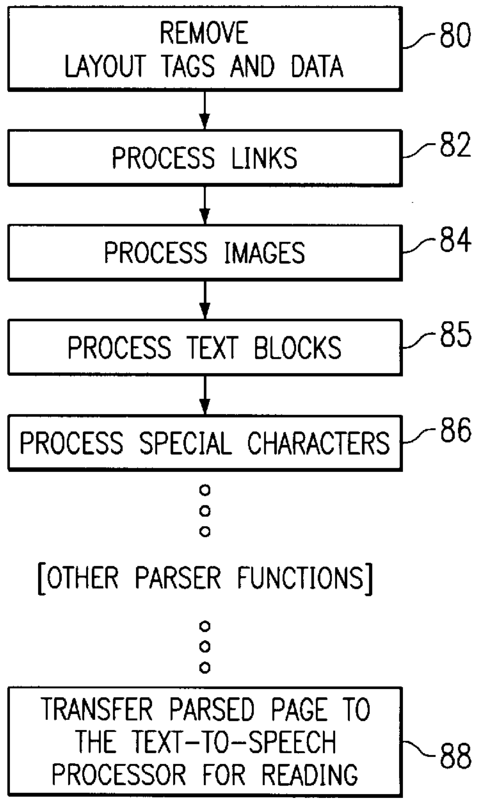
FIG. 6 is a flowchart of a preferred parser function of the present invention.

FIG. 6 is a flowchart of a representative parser function. The routine begins upon receipt of the retrieved Web page. At step 80, the parser makes a first pass through the Web page and removes all tag sets (and their associated data) that are used for page layout purposes. Thus, for example, all content located between the <HEAD> tag set in a typical Web page is removed. At step 82, the parser makes a second pass through the page to process links. In step 82, for example, each link in the page is examined to determine whether the link has an "ALT" text attribute associated therewith. As is well-known, most image links include such alternate text because a browser may not render the image (or the user may elect not to view images). In this step, the parser removes markup associated with the link but retains the alternate text. This enables the reader to identify links (especially image links) by just their alternate text.

After the links are processed, the routine then continues in step 84 to process images. This step removes the image markup and retains the alternate text, if any. At step 85, the parser processes text blocks, such as paragraphs. Thus, for example, the routine makes a pass through the page to identify paragraph breaks (usually designated by a <p> tag set). Each time such a tag set is encountered, the routine removes the markup but inserts a pause so that when the page is read, there is a break between paragraphs. The routine then continues in step 86 to process any special characters. As one example, upon encountering an "&", the parser translates this character into the word "and".

The above parsing functions, of course, are merely representative. Moreover, the functions need not be carried sequentially as has been described. One of ordinary skill in the art will appreciate that further parsing functions may be implemented, with the goal being to produce a simple text page that may be read over the telephone connection and through which the caller may navigate using navigation commands.

Thus, after the given parsing functions are done, the routine transfers the resulting page to the text-to-speech processor for output to the caller. This is step 88 and completes the process.

Figure 7:
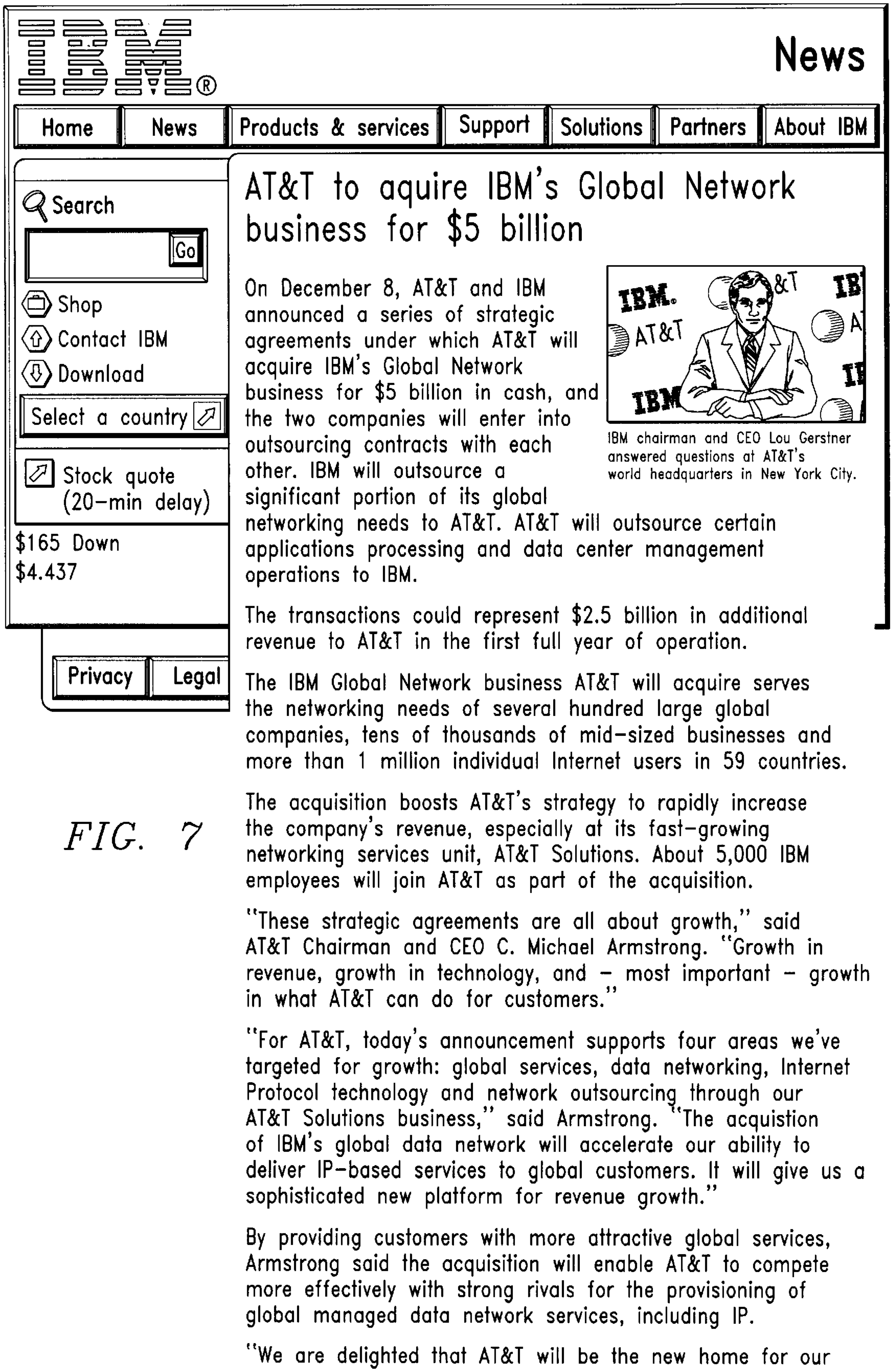
FIG. 7 is a facsimile representation of a portion of a Web page.

FIG. 7 is a facsimile copy of a Web page originally published at www.ibm.com/News/1998/12/08.phtml. The source code for this page is quite complex. It is reproduced below.

```
<HTML>
<HEAD><TITLE>IBM News</TITLE>
<STYLE TYPE="text/css"><!--
input#textfield {background: #ffffcc; color: #000000; font-size:
10; font-weight: normal;}
//-->
</STYLE>
<SCRIPT LANGUAGE="JavaScript">
<!--
window.name="HOMEPAGE";var
ua="UA";ua=navigator.userAgent;function whichBrowser ( ) {var
br="BR";
if(ua.indexOf("NAV") !=-1) {br="Navio"} if(ua.indexOf("Opera") !=-
1) {br="Opera"} if(ua.indexOf("MSIE") !=-1) {br="IE"}
if((ua.indexOf('Mozilla') != -1)&&((ua.indexOf('Spoofer')==-
1)&&(ua.indexOf('compatible')==-1))) {br="NS"}
return br}function whichVersion(br) {var
bv=0;bv=navigator.appVersion.substring(0,1);
if(br=="IE") { (parseInt(bv));}if(br=="NS") {(parseInt(bv)) ;}return
bv;}function whichPlatform( )
{var os="OS";if((ua.indexOf("Win98") !=-1) || (ua.indexOf("Windows
98") !=-1)){os='win32__98'}
if((ua.indexOf("Win95") !=-1) || (ua.indexOf("Windows 95") !=-
1)){os='win32__95'}
else if((ua.indexOf("WinNT") !=-1) || (ua.indexOf("Windows NT") !=-
1)){os='win32__NT'}
else if((ua.indexOf("Win16") !=-1) || (ua.indexOf("Windows 3.1") !=-
1)) {os='win16'}
else if((ua.indexOf("Macintosh") !=-1) || (ua.indexOf("Mac") !=-
1)){os='Mac';}else if(ua.indexOf("SunOS") !=-1){os='unix sun'}
else if(ua.indexOf("IRIX") !=-1){os='unix sgi'}else
if(ua.indexOf("HP-UX") !=-1){os='unix hp'}
else if(ua.indexOf("AIX") !=-1) {os='unix ibm'}else
if(ua.indexOf("OS/2") !=-1) {os='os/2'}else
if(ua.indexOf("Linux") !=-1){ os='linux';}
return os; }b=whichBrowser ( ) ;v=whichVersion(b) ;o=whichPlatform( );
function miniwinpopup(w, h, myurl, targetstring, 1, t)
{var popup=new
Object( ) ;popup.w=w;popup.h=h;popup.1=1;popup.t=t;popup.url=myurl;
popup.trgt=targetstring;
if((b=="IE") || (v==2)) {window.open(popup.url,popup.trgt,
"width="+popup.w+",height="+popup.h+",resizable=1,status=0,left="
+popup.1+",top="+popup.t+",menubar=0,scrollbars=1,toolbar=0, locat
ion=0,directories=0") }
else {window1=window.open(popup.url, popup.trgt,
"width="+popup.w+",height="+popup.h+", resizable=1, status=0, left="
+popup.1+",top="+popup.t+",menubar=0,scrollbars=1,toolbar=0,locat
ion=0,directories=0");
window1.focus ( ); } }function searchField( ) {empty=" ";
s1='<TABLE WIDTH=132 BORDER=0 CELLPADDING=0 CELLSPACING=0
ALIGN="TOP"><TR><TD WIDTH=132 COLSPAN=4><IMG
SRC="/i/v8.2/search.gif" WIDTH=132 HEIGHT=41 ALIGN="left"
HSPACE=0 VSPACE=0 BORDER=0 ALT=" Search "></TD></TR><TR><TD
WIDTH=7 VALIGN="TOP" BGCOLOR="666666">';
s2='<IMG SRC="/i/v8.2/search__1.gif" WIDTH=7 HEIGHT=28 HSPACE=0
VSPACE=0 BORDER=0></TD><TD WIDTH=88 VALIGN="TOP"
BGCOLOR="666666"><FORM METHOD=GET ACTION="http://www.ibm.com/cgi-
bin/findit/nph-V8.2" onSubmit="subsearch(this.q.value); return
false;"><FONT FACE="Arial, Helvetica" SIZE=-1 POINT-SIZE="9">';
sie2='<IMG SRC="/i/v8.2/search__1.gif" WIDTH=7 HEIGHT=29 HSPACE=0
VSPACE=0 BORDER=0 ALT=" "></TD><TD WIDTH=88 VALIGN="TOP"
BGCOLOR="666666"><FORM METHOD=GET ACTION="http://www.ibm.com/cgi-
bin/findit/nph-V8.2" onSubmit="subsearch(this.q.value); return
false;"><FONT FACE="Arial, Helvetica" SIZE=-1 POINT-SIZE="9">';
sunix2='<IMG SRC="/i/v8.2/search__1.gif" WIDTH=7 HEIGHT=39
HSPACE=0 VSPACE=0 BORDER=0 ALT=" "></TD><TD WIDTH=88 VALIGN="TOP"
BGCOLOR="666666"><FORM METHOD=GET ACTION="http://www.ibm.com/cgi-
bin/findit/nph-V8.2" onSubmit="subsearch(this.q.value); return
false;"><FONT FACE="Arial, Helvetica" SIZE=-1 POINT-SIZE="9">';
s3='</FONT><BR><IMG SRC="/i/v8.2/c.gif" WIDTH=88 HEIGHT=2
HSPACE=0 VSPACE=0 BORDER=0 ALT=" "></TD><TD WIDTH=21 VALIGN="TOP"
BGCOLOR="666666"><A
HREF="javascript:subsearch(document.forms[0].q.value);"
onClick="subsearch(document.forms[0].q.value); return false;"
onMouseOver="document.images[&#34;go__button&#34;].src=
arrow__img.src;self.status=&#34;Go&#34;;return true;"
onMouseOut="document.images[&#34;go__button&#34;].src
go__img.src; "><IMG NAME="go__button" SRC="/i/v8.2/go__text.gif"
BORDER="0" WIDTH="21" HEIGHT="18" HSPACE="0" VSPACE="0"
```

-continued

```
ALIGN="LEFT" ALT=" Go "></A></TD></FORM>';
s4='<TD WIDTH=16 VALIGN="TOP"><IMG SRC="/i/v8.2/search_2.gif"
WIDTH=16 HEIGHT=28 HSPACE=0 VSPACE=0 BORDER=0
ALT=" "></TD></TR></TABLE>';
sie4='<TD WIDTH=16 VALIGN="TOP"><IMG SRC="/i/v8.2/search_2.gif"
WIDTH=16 HEIGHT=29 HSPACE=0 VSPACE=0 BORDER=0
ALT=" "></TD></TR></TABLE>';
sunix4='<TD WIDTH=16 VALIGN="TOP"><IMG SRC="/i/v8.2/search_2.gif"
WIDTH=16 HEIGHT=39 HSPACE=0 VSPACE=0 BORDER=0
ALT=" "></TD></TR></TABLE>';
i1 = '<input NAME="q" ID="textfield" type="text" size=" ';
i2 = 'onFocus="document.forms[0].elements[0].value=empty">';p1=s1+
s2+i1;p2=i2+s3+s4;if(b==“Opera") {return(s1+sunix2+i1+7+i2+s3+suni
x4);}if(b=="Navio") {return(p1+10+p2);}
if(((o=="win32_98") || (o=="win32_95"))&&(b=="NS")&&(v>=4))
{return(p1+7+p2);}if(((o=="win32_98") || (o=="win32_95"))&&(b=="IE"
)&&(v>=4)) {return(p1+14+p2);}
if
(((o=="win32_98") || (o=="win32_95"))&&(b=="NS")) {return(p1+10+p2);
}if((o=="win32_98") || (o=="win32_95")) {return(p1+12+p2);}if((o=="M
ac")&&(b=="NS")) {return(p1+11+p2);}
if((o=="Mac")&&(b=="IE")&&(v>=4)){return(p1+13+p2);}if((o=="Mac")
&&(b=="IE")) {return(s1+sie2+i1+13+i2+s3+sie4);}
if(o=="os/2") {return(p1+15+p2);}if((o=="unix ibm") || (o=="unix
sun") || (o=="unix
sgi")){return(s1+sunix2+i1+11+i2+s3+sunix4);}if(o=="unix
hp"){return(s1+sunix2+i1+6+i2+s3+sunix4);}if(o-=="linux") {return(s
1+sunix2+i1+7+i2+s3+sunix4);}if((o=="win32_NT")&&(b=="IE")){retur
n(p1+14+p2);}if((o=="win32_NT")&&(b=="NS")) {return(p1+6+p2);}
if(o=="win16") {return(p1+11+p2);}{return(p1+6+p2);}}
if((document.images)&&((b=="NS") || (v==4)))
{var arrow_img= new Image( );arrow_img.src =
"/i/v8.2/go_arrow.gif";var go_img = new
Image( );go_img.src="/i/v8.2/go_text.gif"};function
subsearch(s) {var formstr=" ";for (count=0; count <= s.length ;
count++) {if(s.substring(count,count+1)==" ") {formstr+="+";} else
if(s.substring(count,count+1)=="\ " ") {formstr+="\%22"}
else if(s.substring(count,count+1)=="\+") {formstr+="PLUS"}
else{formstr+=s.substring(count,count+1);}};searchur1=("http://ww
w.ibm.com/cgi-bin/findit/nph-v8.2?q=");
remote =
miniwinpopup(322,360,searchur1+formstr,"SEARCH",140,160);}var
site = null;var gt=unescape('%3e');
function 32 launch( ) {site=
miniwinpopup(175,115,'http://www.ibm.com/IBM/Stock/Ticklet/Frame'
,'ibmstock',140,160);
if (site != null) {if(site.opener==null) {site.opener=self;}}}
//-->
</SCRIPT>
</HEAD>
<BODY BGCOLOR="#ffffff" LINK="00006b" VLINK="56089f"
ALINK="00006b">
<!--***************START GLOBAL NAVIGATION
TABLE*********************--><!--MASTHEAD--><IMG
SRC="/News/images/masthead.gif" WIDTH=600 HEIGHT=49 HSPACE=0
VSPACE=0 BORDER=0 ALIGN="top" ALT="IBM News"><BR CLEAR="all">
<TABLE WIDTH=600 HEIGHT=17 BORDER=0 CELLPADDING=0 CELLSPACING=0
VALIGN=top><TR HEIGHT=17><TD
COLSPAN=2><A
HREF="/"><IMG SRC="/i/v8.4/h_b.gif" BORDER=0 ALT="[ Home ]"
ALIGN=LEFT WIDTH=78 HEIGHT=17 HSPACE=0 VSPACE=0 HSPACE=0
VSPACE=0></A><A
HREF="/News/"><IMG SRC="/i/v8.4/n_h.gif" BORDER=0 ALT="[ News ]"
ALIGN=LEFT WIDTH=77 HEIGHT=17 HSPACE=0 VSPACE=0></A><A
HREF="/Products/"><IMG SRC="/i/v8.4/p_b.gif" BORDER=0 ALT="[
Products & services]" ALIGN=LEFT WIDTH=129 HEIGHT=17 HSPACE=0
VSPACE=0></A><A
HREF="/Support/"><IMG SRC="/i/v8.4/su_b.gif" BORDER=0 ALT="[
Support ]" ALIGN=LEFT WIDTH=79 HEIGHT=17 HSPACE=0 VSPACE=0></A><A
HREF="/Solutions/"><IMG SRC="/i/v8.4/so_b.gif" BORDER=0 ALT="[
Solutions ]" ALIGN=LEFT WIDTH=79 HEIGHT=17 HSPACE=0
VSPACE=0></A><A
HREF="/Partners/"><IMG SRC="/i/v8.4/pa_b.gif" BORDER=0 ALT="[
Partners ]" ALIGN=LEFT WIDTH=79 HEIGHT=17 HSPACE=0
VSPACE=0></A><A
HREF="/IBM/" onMouseOver="self.status='About IBM' ;return
true"><IMG SRC="/i/v8.4/ai_b.gif" BORDER=0 ALT="[ About IBM ]"
ALIGN=LEFT WIDTH=79 HEIGHT=17 HSPACE=0
VSPACE=0></A></TD></TR></TABLE>
```

-continued

```
<!--*****************END GLOBAL NAVIGATION
TABLE********************-->
<TABLE WIDTH=600 BORDER=0 CELLPADDING=0 CELLSPACING=0
VALIGN="left">
<TR><!--**********SEARCH CONSOLE************-->
<TD WIDTH=132 VALIGN="TOP"><SCRIPT LANGUAGE="JAVASCRIPT">
<!--
if((b=="IE") || (o=="os/2") || (v>2)){document.write(searchField( )) ;}
if(((o=="Mac")&&((b=="IE") || (b=="NS"))&&(v==3)) || ((v==2)&&(b!="IE
")) || (((o=="win32_NT") || (o=="win32_95"))&&(b=="IE"))) { }
else{document.forms[0].elements[0].focus( ) }
//--=
</SCRIPT><NOSCRIPT><A HREF="/Search/"><IMG
SRC="/i/v8.2/searchns2.gif" WIDTH=132 HEIGHT=41 ALIGN="left"
HSPACE=0 VSPACE=0 BORDER=0 ALT=" Search "></A><BR
CLEAR="all"></NOSCRIPT>
<IMG SRC="/i/v8.2/search_strip.gif" WIDTH=132 HEIGHT=4 HSPACE=0
VSPACE=0 BORDER=0 ALT=" "><A HREF="/Shop/"
onMouseover="self.status='Shop';return true"><IMG
SRC="/i/v8.2/search_shop_b.gif" WIDTH=132 HEIGHT=20 HSPACE=0
VSPACE=0 BORDER=0 ALT=" Shop "></A><A HREF="/Contact/"
onMouseover="self.status='Contact IBM';return true"><IMG
SRC="/i/v8.2/search_contact_b.gif" WIDTH=132 HEIGHT=19 HSPACE=0
VSPACE=0 BORDER=0 ALT=" Contact IBM "></A><A HREF="/Download/"
onMouseover="self.status='Download';return true"><IMG
SRC="/i/v8.2/search_download_b.gif" WIDTH=132 HEIGHT=21 HSPACE=0
VSPACE=0 BORDER=0 ALT=" Download "></A><IMG
SRC="/i/v8.2/search_non.gif" WIDTH=132 HEIGHT=4 HSPACE=0 VSPACE=0
BORDER=0 ALT=" "><A
HREF="/Planetwide/Popups/other/"TARGET="PROJECTS"
onMouseOver="self.status='Select a country'; return true"
onClick= 'miniwinpopup(298,348, "/Planetwide/Popups/other/",
"PROJECTS",140,160) ; return false; "><IMG
SRC="/i/v8.2/search_select.gif" WIDTH=132 HEIGHT=27 HSPACE=0
VSPACE=0 BORDER=0 ALT=" Select a country "></A><A
HREF="javascript:launch( )" onMouseOver="window.status='Stock
quote'; return true"><IMG
SRC="/i/v8.2/search_stock.gif" WIDTH=132 HEIGHT=33 HSPACE=0
VSPACE=0 BORDER=0 ALIGN="top" ALT=" Stock quote "></A><!--
***TICKER TABLE NEST***-->
<TABLE WIDTH=132 BORDER=0 CELLPADDING=0 CELLSPACING=0
VALIGN="left">
<TR>
<TD WIDTH=5 VALIGN="TOP" BGCOLOR="000000"><IMG
SRC="/i/v8.2/clear.gif" WIDTH=5 HEIGHT=10 ALIGN="left" HSPACE=0
VSPACE=0 BORDER=0 alt=" "></TD>
<TD WIDTH=117 VALIGN="TOP" BGCOLOR="000000"><FONT SIZE=-2
FACE="arial, helvetica, geneva" COLOR=CC33CC>$165   Down
$4.437</FONT><BR>
    <FONT SIZE=-2 FACE="arial, helvetica, geneva"
COLOR=FFFFFF><I>December 10, 1998<BR>
    16:00</I></FONT></TD>
<TD WIDTH=10 VALIGN="TOP" BGCOLOR="666666"><IMG
SRC="/i/v8.2/right_ticker.gif" WIDTH=10 HEIGHT=59 HSPACE=0
VSPACE=0 BORDER=0 ALIGN="top" alt=" "></TD>
</TR>
</TABLE>
<!--***END TICKER TABLE NEST***--><IMG
SRC="/i/v8.2/under_ticker1.gif" WIDTH=132 HEIGHT=7 HSPACE=0
VSPACE=0 BORDER=0 ALIGN="top" alt=" "><IMG
SRC="/News/images/shadow.gif" WIDTH=132 HEIGHT=4 HSPACE=0
VSPACE=0 BORDER=0 ALIGN="top" alt=" "><!--**** STRETCH BLUE SPACE
HERE!! *****--><IMG SRC="/News/images/stretch.gif" WIDTH=132
HEIGHT=46 HSPACE=0 VSPACE=0 BORDER=0 ALIGN="top" alt=" "><!--****
end STRETCH BLUE SPACE HERE!! *****--><A HREF="/Privacy/"
onMouseover="self.status='Privacy';return true"<>IMG
SRC="/i/v8.2/privacy.gif" WIDTH=91 HEIGHT=17 ALT=" Privacy "
HSPACE=0 VSPACE=0 BORDER=0 ALIGN-top"></A><A HREF="/Legal/"
onMouseover="self.status='Legal';return true"<>IMG
SRC="/i/v8.2/legal.gif"WIDTH=41 HEIGHT=17 ALT=" Legal " HSPACE=0
VSPACE=0 BORDER=0 ALIGN="top"></A><! --*****END SEARCH
CONSOLE*****--></TD>
<!--********* MAIN CONTENT **********--><TD WIDTH=468
VALIGN="TOP">
<TABLE BORDER=0 CELLPADDING=0 CELLSPACING=0 WIDTH=468>
<TR>
<TD WIDTH=468 COLSPAN=2 VALIGN=TOP><IMG
SRC="/News/images/curved_top_strip.gif" WIDTH=468 HEIGHT=17
align=top VSPACE=0 HSPACE=0 border=0 alt=" ">
```

-continued

```
</TD></TR>
<TR>
<TD WIDTH=15 VALIGN="TOP"><IMG SRC="/News/images/clear.gif"
WIDTH=15 HEIGHT=10 BORDER=0 HSPACE=0 VSPACE=0 alt=" "></TD>
<TD WIDTH=453 VALIGN="TOP">
<FONT FACE="arial,HELVETICA,GENEVA" size="+1">
AT&T to acquire IBM's Global Network business for $5 billion
<p>
FONT FACE="arial,HELVETICA,GENEVA" size="-1">
<img src="/News/1998/12/images/louatatt.gif" width="160"
height="160" alt="[Lou Gerstner photo]" align="right"
hspace="10">
On December 8, AT&T and IBM announced a series of strategic
agreements under which AT&T will acquire IBM's Global Network
business for $5 billion in cash, and the two companies will enter
into outsourcing contracts with each other. IBM will outsource a
significant portion of its global networking needs to AT&T.
AT&T will outsource certain applications
processing and data center management operations to IBM.
<p>
The transactions could represent $2.5 billion in additional
revenue to AT&T in the first full year of operation.
<p>
The IBM Global Network business T&T will acquire serves the
networking needs of several
hundred large global companies, tens of thousands of mid-sized
businesses and more than 1 million
individual Internet users in 59 countries.
<p>
The acquisition boosts AT&T's strategy to rapidly increase
the company's revenue, especially at its
fast-growing networking services unit, AT&T Solutions. About
5,000 IBM employees will join AT&T
as part of the acquisition.
<p>
"These strategic agreements are all about growth," said AT&T
Chairman and CEO C. Michael
Armstrong. "Growth in revenue, growth in technology, and - most
important - growth in what AT&T
can do for customers.
<p>
"For AT&T, today's announcement supports four areas we've
targeted for growth: global services,
data networking, Internet Protocol technology and network
outsourcing through our AT&T Solutions
business," said Armstrong. "The acquisition of IBM's global data
network will accelerate our ability to
deliver IP-based services to global customers. It will give us a
sophisticated new platform for revenue
growth."
<p>
By providing customers with more attractive global services,
Armstrong said the acquisition will
enable AT&T to compete more effectively with strong rivals
for the provisioning of global managed
data network services, including IP.
<p>
"We are delighted that AT&T will be the new home for our
Global Network operation," said IBM
Chairman and CEO Louis V. Gerstner, Jr. "With this agreement, the
network will receive the
management focus and resources necessary to maintain its standing
as a world-class provider of
connectivity to IBM and millions of customers.
<p>
"AT&T will use its expertise to enhance and expand the Global
Network to the benefit of its
customers, including IBM," he said. "We can now focus fully on
helping our customers take advantage
of the emerging networked world through e-business applications
and solutions."
<p>
IBM's Global Network has more than 1,300 dial-up points of
presence and dedicated access from
more than 850 cities in 59 countries. The Global Network offers
business customers innovative
services and worldwide operations and support, including in-
country, native-language support
personnel.
```

-continued

```
<p>
AT&T said its acquisition of IBM's high capacity global
network would be supportive of the
100-city, IP-based network that would be created as part of the
global joint venture announced by
AT&T and BT in July.
<p>
IBM said that this transaction, in its entirety, is not expected
to have a significant impact on the
company's 1999 operational results. AT&T said earnings
dilution from the transaction is expected to be insignificant in
the first full year of operation and accretive thereafter.
<p>
AT&T and IBM said they expect the acquisition to conclude by
mid-1999, following clearance by
U.S. regulators and certain regulatory authorities outside the
U.S.
<p>
Armstrong said today's announcement is about more than acquiring
IBM's global network. "We
have also reached several significant outsourcing agreements that
match each company's strengths with
the other company's business needs," he said.
<p>
IBM has awarded AT&T Solutions an outsourcing contract valued
at $5 billion over five years for a
significant portion of IBM's own global networking needs, making
it the single largest networking
outsourcing contract ever awarded. The contract is expected to
double the network outsourcing
revenue of AT&T Solutions and will enable it to grow more
rapidly by serving a wider set of customer
needs with a broadened scope of services.
<p>
In addition, AT&T and IBM's Global Services unit have reached
agreement for outsourcing services
valued at about $4 billion over the next 10 years. As part of the
agreement, IBM will manage AT&T's
legacy applications processing, including billing, service-order-
processing, installation and maintenance, for customers of
AT&T business long-distance services. In addition, IBM will
assume management of AT&T's data processing centers, which
operate corporate information systems such as accounts payable
and receivable and employee payroll and benefits. Under the
agreement, more than 2,000
AT&T management employees will be offered positions with IBM.
</font>
</TD></TR>
</TABLE><!--*********   end MAIN CONTENT   **********--><!--**Don't
move***--></TD><!--****Don't move***-->
</TR>
</TABLE>
</BODY>
</HTML>
```

FIG. 8 represents the above HTML after it has been processed by the parser to remove the irrelevant markup. This was step 82 in the parsing routine. FIG. 9 represents the HTML after the links and images have been converted to their "alternate" text format and after the special characters have been processed. (In both cases, only partial results are illustrated). This output is the content read to the user.

The above-described parsing technique is merely representative. An alternative is for the parser (upon receipt of the Web page) to execute the source code of the retrieved Web page in a virtual manner. The resulting text and image information would then be stored in memory (e.g., as a "picture") and the parser would then pass the text to the reader.

The given control routines illustrated above in FIGS. 4–6 are preferably implemented in computer software as a set of instructions run on a processor of a general purpose computer. The control routine of FIG. 3 preferably executes in a given thread, and thus multiple users are serviced on a given telephone server.

The present invention also has particular utility to enable a visually-impaired user to access and obtain Web content. As noted above, the invention contemplates use of any conventional telephone handset for accessing Web content through the telephone server. Moreover, the telephone server is not necessarily a specialized platform. The functionality may be implemented by any computer. Thus, a given Web site may implement the service for the content hosted by that site.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would, recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

I claim:

1. A method for enabling a user having access to a telephone device to browse the Internet without a Web browser, comprising the steps of:

establishing a connection between the user's telephone device and a computer;

using the telephone device to enter information identifying a given URL;

retrieving to the computer a Web page associated with the given URL;

receiving a user account identifying an output method; and delivering the Web page to the user using the output method, wherein the identified output method is selected from the group consisting of converting given text of the Web page to speech for the user, transmitting the Web page to a given destination telephone number, e-mailing the Web page to a given e-mail destination address, e-mailing the URL to a given e-mail destination address.

2. The method as described in claim 1 wherein the information is entered using a keypad of the telephone device.

3. The method as described in claim 1 wherein the information is entered using a spoken input.

4. The method as described in claim 1 wherein the given text of the Web page includes at least one link.

5. The method as described in claim 4 further including the step of having the user navigate the link to retrieve another page.

6. The method as described in claim 1 wherein the connection is selected from a group consisting essentially of a landline, a wireline, a satellite line, and a personal communications line.

7. The method as described in claim 1 further including the step of validating the user prior to retrieving the Web page.

8. A method for enabling a user having access to a telephone device to browse the Internet without a Web browser, comprising the steps of:

establishing a connection between the user's telephone device and a computer;

using the telephone device to enter information identifying a given URL;

retrieving to the computer a Web page associated with the given URL;

receiving a user account identifying a reading method;

converting given text of the Web page to speech; and outputting the speech to the user based on the reading methods, wherein the identified reading method is selected from the group consisting of headlines only and headlines with associated stories.

9. The method as described in claim 8 wherein the information is entered using a keypad of the telephone device.

10. The method as described in claim 8 wherein the information is entered using a spoken input.

11. The method as described in claim 8 further including the step of identifying a link in the Web page.

12. The method as described in claim 11 further including the steps of:

retrieving a second Web page associated with the link;

converting given text of the second Web page to speech; and outputting the speech to the user based on the reading method.

13. A computer accessible through a telephone network for providing a remote Web page delivery service, comprising:

a Web browser;

a text-to-speech processor; and a control program (a) for receiving from a telephone device information identifying a URL, (b) for controlling the Web browser to retrieve a Web page; (c) for receiving a user account identifying a reading method; (d) for controlling the text-to-speech processor to convert given text in the Web page to speech; and (e) for outputting the speech to the user based on the reading method, wherein the identified reading method is selected from the group consisting of headlines only and headlines with associated stories.

14. The computer as described in claim 13 further including a speech recognizer for recognizing spoken inputs received from the telephone device.

15. The computer as described in claim 13 wherein the control program responds to additional navigation commands received from the telephone device.

16. The computer as described in claim 13 further including means for validating a user to the remote Web page delivery service.

17. A computer program product in a computer readable medium for use in a computer having a Web browser and a text-to-speech processor, comprising:

means responsive to receipt of information input from a telephone device identifying a URL for controlling the Web browser to initiate retrieval of a Web page;

means responsive to receipt of the Web page for controlling the text-to-speech processor to convert given text in the Web page to speech; and means responsive to conversion of the given text in the Web page to speech for outputting the speech to the telephone device based on a reading method identified in a user account, wherein the identified reading method is selected from the group consisting of headlines only and headlines with associated stories.

18. The computer program product as described in claim 17 further including means for validating a user.

19. The computer program product as described in claim 17 further including means for receiving navigation commands from the telephone device to control output of the speech.

20. A computer accessible through a telephone network for providing a remote Web page delivery service, comprising:

a Web browser; and a control program (a) for receiving from a telephone device information identifying a URL, (b) for controlling the Web browser to retrieve a Web page; (c) for receiving a user account identifying an output method; and (d) for delivering the Web page to the user using the output method, wherein the identified output method is selected from the group consisting of converting given text of the Web page to speech for the user, transmitting the Web page to a given destination telephone number, e-mailing the Web page to a given e-mail destination address, and e-mailing the URL to a given e-mail destination address.

21. A computer program product in a computer readable medium for use in a computer having a Web browser, comprising:

means responsive to receipt of information input from a telephone device identifying a URL for controlling the Web browser to initiate retrieval of a Web page;

means responsive to retrieval of the Web page for receiving a user account identifying an output method; and means for delivering the Web page to the user using the output method, wherein the identified output method is selected from the group consisting of converting given text of the Web Rage to speech for the user, transmitting the Web page to a given destination telephone number, e-mailing the Web page to a given e-mail destination address, and e-mailing the URL to a given e-mail destination address.

* * * * *

UNITED STATES PATENT AND TRADEMARK OFFICE

CERTIFICATE OF CORRECTION

PATENT NO. : 6,718,015 B1

DATED : April 6, 2004

INVENTOR(S) : Berstis

It is certified that error appears in the above-identified patent and that said Letters Patent is hereby corrected as shown below:

<u>Drawings</u>,
Replace Figure 1 with the following replacement sheet.

<u>Column 17</u>,
Line 49, after “has been” delete “45”.

<u>Column 19</u>,
Line 56, delete “methods” and insert -- method --.

<u>Column 22</u>,
Line 7, before “to speech” delete “Rage” and insert -- page --.

Signed and Sealed this

Twelfth Day of April, 2005

JON W. DUDAS

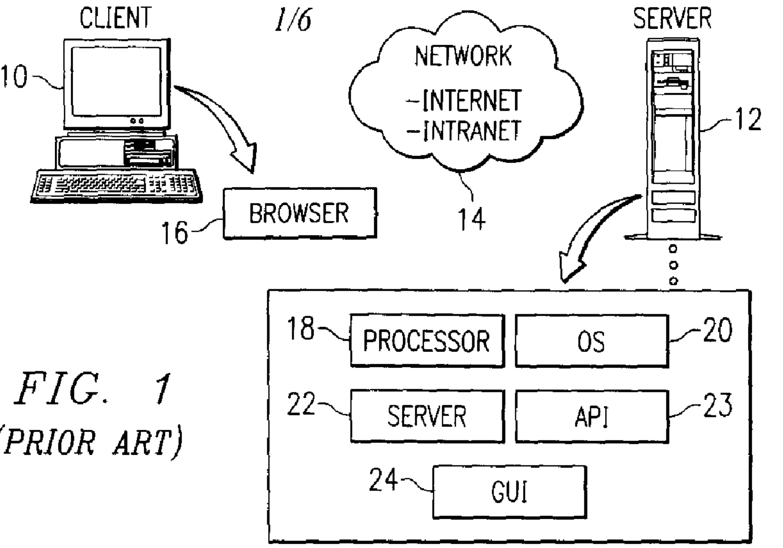
*FIG. 1*
*(PRIOR ART)*
*FIG. 2*
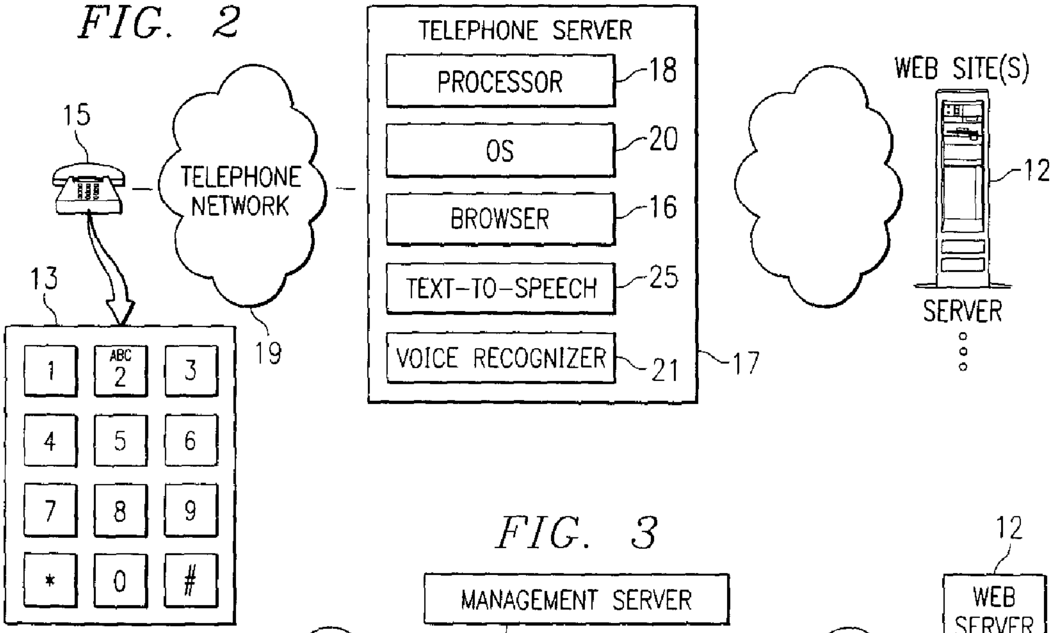
*FIG. 3*
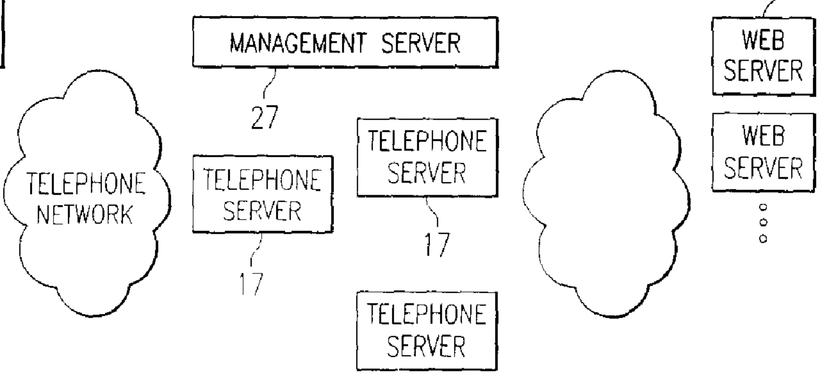

*Director of the United States Patent and Trademark Office*